United States Patent [19]

Alexander

[11] E Re. 29,444

[45] Reissued Oct. 18, 1977

[54] FASTENER TOOL

[75] Inventor: Robert H. Alexander, Columbia, S.C.

[73] Assignee: Rockwell International Corporation, Pittsburgh, Pa.

[21] Appl. No.: 560,554

[22] Filed: Mar. 20, 1975

Related U.S. Patent Documents

Reissue of:

[64] Patent No.: 3,821,991
Issued: July 2, 1974
Appl. No.: 252,479
Filed: May 11, 1972

U.S. Applications:

[63] Continuation-in-part of Ser. No. 104,209, Jan. 6, 1971.

[51] Int. Cl.[2] ..... B25B 23/14

[52] U.S. Cl. ..... 173/12; 81/52.5; 91/1; 173/20

[58] Field of Search ..... 173/12, 20; 91/1, 59; 81/52.5 R; 73/136 R, 139; 29/240

[56] References Cited

U.S. PATENT DOCUMENTS

| | | | |
|---|---|---|---|
| 3,195,655 | 7/1965 | Karden | 173/12 X |
| 3,259,025 | 7/1966 | Kessler et al. | 91/1 |
| 3,590,582 | 7/1971 | German et al. | 173/12 X |
| 3,596,718 | 8/1971 | Fish et al. | 173/12 |
| 3,624,721 | 11/1971 | Workman | 91/1 |
| 3,661,041 | 5/1972 | Lesner | 81/52.5 |
| 3,686,983 | 8/1972 | Flagge | 173/12 X |
| 3,719,111 | 3/1973 | Study | 81/52.5 |
| 3,732,934 | 5/1973 | Brandenburg | 173/12 |
| 3,774,479 | 11/1973 | Lesner | 81/52.5 |

*Primary Examiner*—Ernest R. Purser
*Attorney, Agent, or Firm*—Strauch, Nolan, Neale, Nies & Kurz

[57] ABSTRACT

A tool including a fastener rotating output member and mechanism for indicating if a fastener rotated by said output member has been tightened to a prescribed torque and/or for providing an indication of the length of time for which the fastener was tightened.

27 Claims, 5 Drawing Figures

FIG. 2
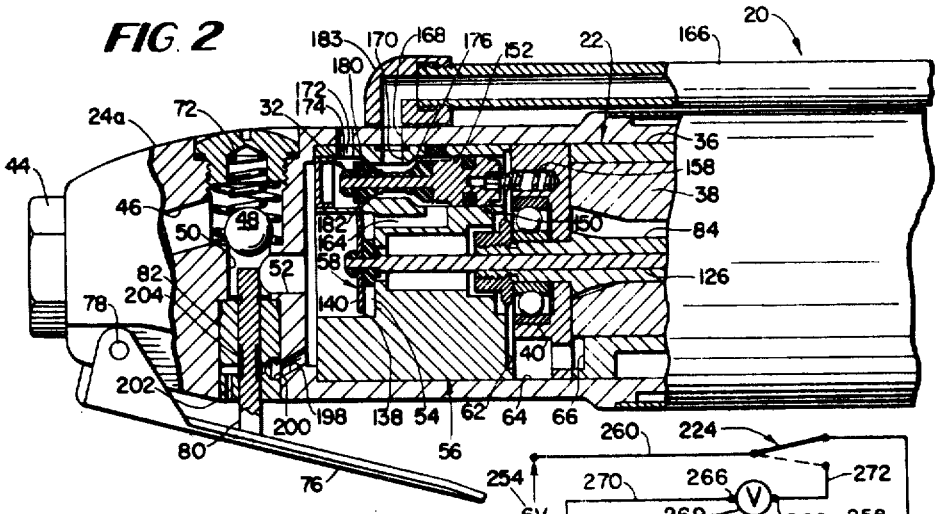
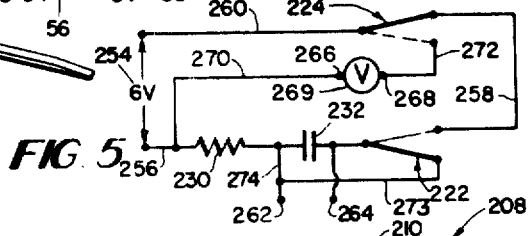
FIG. 5
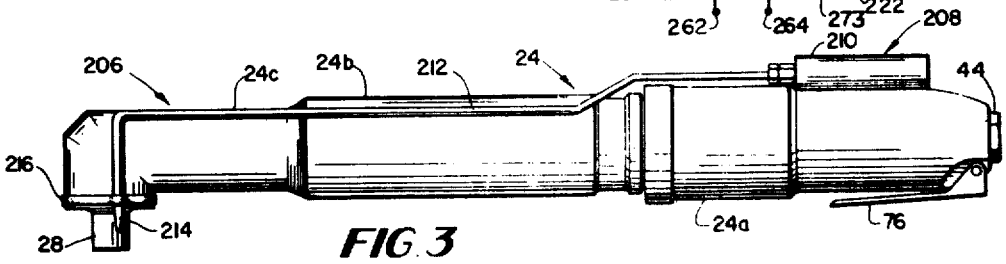
FIG. 3
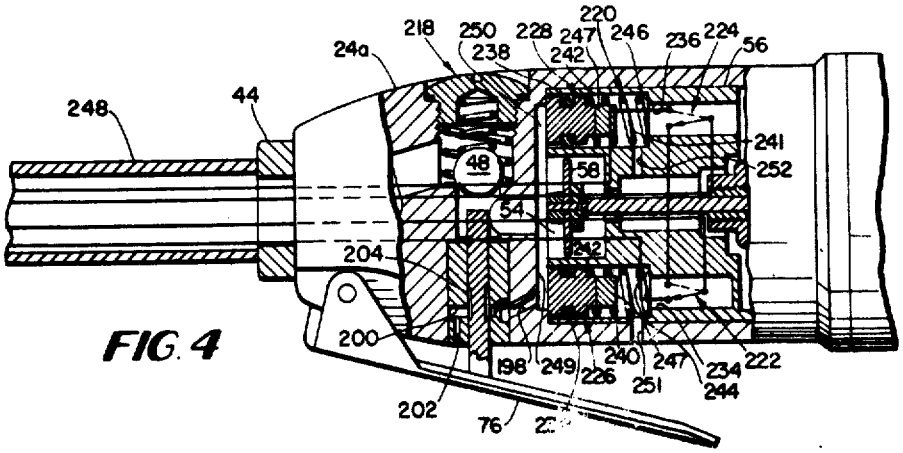
FIG. 4

FASTENER TOOL

Matter enclosed in heavy brackets [ ] appears in the original patent but forms no part of this reissue specification; matter printed in italics indicates the additions made by reissue.

This application is a continuation-in-part of copending U.S. Pat. application No. 104,209 filed Jan. 6, 1971.

The present invention relates to tools, and more specifically, to novel, improved, fastener tools which generate a signal when a fastener being tightened reaches a prescribed torque and/or generate a signal indicative of the length of time for which the fastener was tightened.

Among the devices heretofore proposed for providing an indication that a fastener has been tightened to a selected torque are those disclosed in U.S. Pat. Nos. 3,009,371 issued Nov. 21, 1961, to Hines; 3,389,623 issued June 25, 1968, to Gill; 3,472,102 issued Oct. 14, 1969, to Dunlap et al.; and 3,523,471 issued Aug. 11, 1970, to Lance. None of these tools provide an indication of the length of time for which the fastener was tightened.

Devices similar in some respects to those discussed in the preceding paragraph are disclosed in U.S. Pat. Nos. 2,901,934 issued Sept. 1, 1969, to Dunham and 3,581,607 issued June 1, 1971, to Rogers. However, the device disclosed in the Dunham patent merely provides an indication that a wrench has been applied to a fastener; it does not indicate whether or not the fastener is tightened to the selected torque or the length of time for which the fastener is tightened. Rogers' tool generates a signal when the fastener is set to a desired depth; but this signal is employed to actuate a motor shut-off mechanism and not to provide an indication that the desired depth has been reached. The Rogers tool does not produce a torque indicative signal or one indicative of the length of time for which a fastener is set.

One primary object of the present invention resides in the provision of novel fastener tools capable of providing a signal indicating that a fastener has been tightened to a selected torque which are superior to those heretofore available in one or more respects such as reliability and/or ease of operation, capacity, service life, cost, ease of maintenance, etc.

In some circumstances a torque responsive mechanism can be triggered to generate a signal of the character just described even though the fastener has not been properly tightened. This may occur if a fastener is cross threaded on a bolt or stud or if the threads are too tight, for example. In both of these exemplary cases the resistance to rotation can increase to the level at which the torque responsive mechanism will respond in many less turns than are needed to fully tighten the fastener.

Another important and primary object of the invention accordingly resides in the provision of novel tools capable of generating a signal by which properly tightened fasteners can be distinguished from those which are not correctly tightened but nevertheless offer sufficient resistance to turning to trigger a torque responsive, signal generating mechanism.

Typically, the signal will be indicative of the length of time for which the fastener has been tightened. The length of indicated time can be compared with a standard time for tightening the particular type of fastener involved, making it possible to readily ascertain whether the fastener has been properly tightened.

Another important but more specific object of the invention accordingly resides in the provision of novel fastener tools capable of generating a signal indicative of the length of time for which a fastener has been tightened.

Still another important object of the invention resides in the provision of novel tools which perform both of the functions indicated above; that is, which produce a signal or combination of signals indicative of the tightening of a fastener to a selected torque and of the length of time for which the fastener is tightened.

The signals generated by typical tools in accord with the present invention will be electrical or pneumatic. These signals can be processed to provide a temporary indication and/or permanent record of the time for which the fastener was tightened and/or of whether the fastener was tightened to the selected torque. The signal may also be utilized to actuate or operate a paint squirting or other device capable of producing on or adjacent the fastener a visual indication showing that the fastener has been tightened in a manner which will produce a satisfactory joint.

Typically, tools of the type with which the present invention is concerned will be motor driven; and they will have a torque responsive mechanism for automatically shutting off the motor when the fastener is tightened to the selected torque (exemplary of the tools of this general character are those disclosed in U.S. Pat. No. 3,195,704 issued July 20, 1965, to Linsker and in parent U.S. Pat. application No. 104,209). In tools of this character in accord with the present invention the signal generating mechanism is actuated at the same time the motor is shut off if a torque responsive signal is wanted or both when the motor is energized and shut off if a time indicative signal or signals indicative of both time and the reaching of a selected torque are desired.

Air or other pneumatic motors can be used to advantage in tools in accord with the present invention. In such tools the operating fluid may be employed to open and close appropriate switches and thereby produce torque, time, or torque and time indicative, electrical signals. Or the operating fluid may be used to generate a pneumatic signal or signals.

Other important but more specific objects of the invention accordingly reside in the provision of novel tools capable of providing a signal which is indicative of a fastener having been tightened to a selected torque and/or for a specified period of time and is:

1. readily processable to provide a temporary indication and/or permanent record of whether the fastener was correctly torqued and/or tightened for a satisfactory period of time.

2. capable of actuating a visual marking unit to produce a visual, torque and/or time indicative mark on or adjacent the fastener.

Still other important but specific objects of the invention reside in the provision of novel tools capable of providing a signal indicative of a fastener having been tightened to a selected torque and/or for a specified period of time;

3. which are motor driven and which have a torque responsive mechanism automatically operable when the selected torque is reached to shut off the motor and to actuate a signal generating mechanism to produce a torque indicative signal.

4. which are motor driven and which include a timing mechanism, a torque responsive mechanism for stopping the motor when a fastener is tightened to a selected torque, and an arrangement for starting and stopping the timing sequence as the motor is started and stopped to provide an indication of the length of time for which the motor was run to tighten a fastener.

5. which, in conjunction with the preceding object, are also capable of producing a signal when the torque responsive mechanism stops the motor which will indicate that the fastener has been tightened to the selected torque.

6. which are driven by a pneumatic motor and in which the operating fluid is utilized to generate a pneumatic signal or signals.

7. which are driven by a pneumatic motor and in which the operating fluid is utilized to generate an electrical signal or signals.

8. which have various combinations of the attributes to which the objects previously set forth are directed.

Other important objects and features and further advantages of the invention will become apparent from the appended claims and as the ensuing detailed description and discussion proceeds in conjunction with the accompanying drawing, in which:

FIG. 2 is a view similar to FIG. 1 of the rear end of the tool with the signal generating mechanism in its actuated configuration;

FIG. 3 is a side view of a second form of fastener tool in accord with the principles of the present invention;

FIG. 4 is a view similar to FIG. 2 of a third form of tool in accord with the principles of the invention but with the signal generating mechanism in its unoperated configuration; and FIG. 5 is a schematic of electrical circuitry employed in the tool of FIG. 4.

Figure 1:
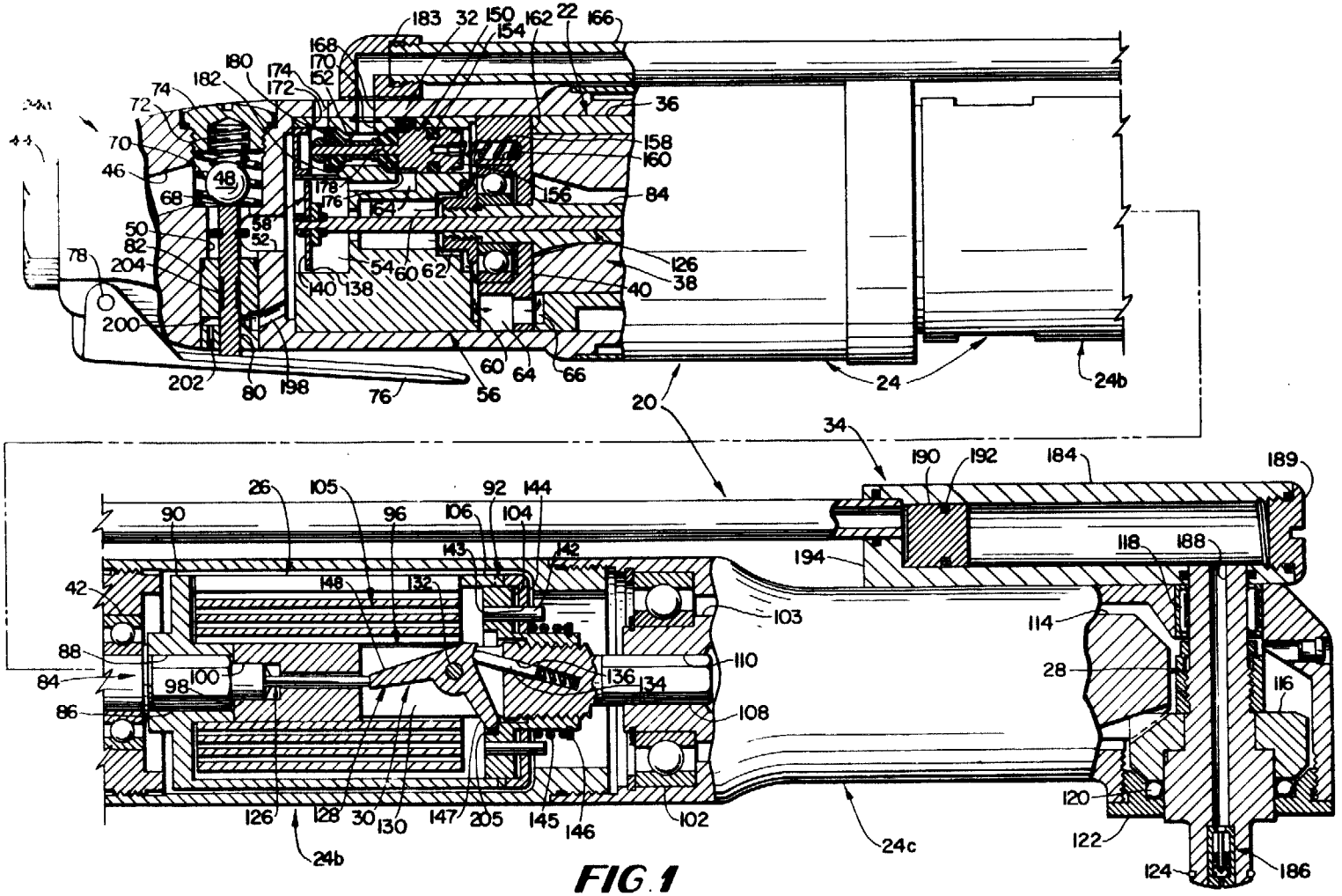
FIG. 1 is a partially sectioned side view of a signal generating fastener tool constructed in accord with the principles of the present invention with the signal generating mechanism in its unactuated configuration.

Referring now to the drawing, FIGS. 1 and 2 illustrate a power-operated fastener tool 20 of the nut runner type, which is constructed in accord with the principles of the present invention. Tool 20 includes an air motor 22 housed in a casing 24 having motor, intermediate, and angle head sections 24a, 24b, and 24c. The motor is connected through a brake or energy absorbing device 26 to a rotatably mounted output member 28 which is adapted to have a socket or other fastener engageable component[1] secured to it. It is the function of brake 26 to gradually slow down and absorb kinetic energy from the rotating motor and other tool components as a fastener is being tightened so that the kinetic energy will not be transmitted to and overtighten the fastener.

[1]The term "fastener engaging component", as employed herein, is intended to have a broad meaning and to include, without limitation, flexible and rigid extension shafts and other motion transmitting members or mechanism to which the screwdriver or other bit, socket, or other components directly engaging the fastener might be attached.

Tool 20 also includes a torque responsive shut-off mechanism 30 for automatically terminating the flow of air to motor 22 when the fastener being tightened reaches a preselected torque.

The tool further includes a novel signal generating mechanism 32 which is actuated as the shut-off mechanism terminates the flow of air to motor 22. The generation of a signal is accordingly an indication that the fastener has been tightened to the selected torque.

In tool 20, the signal is a pulse of compressed air which is applied to a marking unit 34 to propel a small quantity of marking ink or dye through output member 28 onto the fastener. Thus, one can readily ascertain by visual inspection that the fastener has been tightened to the selected torque.

Referring again to the drawing, air motor 22 is of a commercially available type and, will not be described in detail herein. Briefly, however, the air motor includes a casing 36 in which a rotor 38 is rotatably supported by bearings 40 and 42.

Air is supplied to a motor 22 through a line (not shown) connected to a fitting 44 which communicates with an aperture (not shown) through the rear end of casing section 24a. From the fitting and aperture the air flows through a passage 46, around a manually displaceable valve 48, and through passages 50 and 52 into a chamber 54 formed in a valve block 56 in casing section 24a. From chamber 54, the air flows around a disc type valve member 58, which is a component of automatic shut-off mechanism 30, and, as shown by arrows 60, then through communicating passages 62, 64, and 66 into motor 22 to drive rotor 38.

The manually displaceable valve member 48 which controls the flow of air to the interior of the tool is biased against a seat 68 at the inlet end of passage 50 and also laterally positioned by springs 70 and 72. These springs are kept in place by a threaded retainer 74.

The valve member may be displaced from the seated or closed position (FIG. 2) to an open position (FIG. 1) to allow air to flow from passage 46 into passage 50 and then to motor 22 by depressing a lever 76 pivotally fixed to the motor section 24a of the tool casing as by pivot pin 78. Lever 76 engages a plunger 80 slidably mounted in a guide or fitting 82 disposed in casing section 24a. When lever 76 is depressed toward casing section 24a, plunger 80 unseats valve member 48.

The subsequent release of lever 76 allows spring 72 to reseat valve member 48, restoring plunger 80 and lever 76 to the positions shown in FIG. 2. This terminates the flow of air into the tool.

The rotor 38 of air motor 22 has a shaft 84 with a hexagonally configured section 86. This shaft section extends through a matching, hexagonally configured bore 88 in end member 90 of an input assembly 92 which is a component of brake 26. Thus, rotor shaft 84 supports one end of the input assembly. The arrangement just described also drive connects the input assembly to the motor shaft.

In addition to the input assembly, brake 26 includes an output shaft 96. At one end the output shaft is supported by rotor shaft 84, which has a circularly sectioned end portion 98. This end portion of the shaft extends into a similarly configured recess 100 in the output shaft, leaving shaft 96 free to rotate relative to shaft 84 and input assembly 92.

The other end of shaft 96 is rotatably supported in a bearing 102 by a tubular drive member 103 housed in the angle head section 24c of casing 24.

Shaft 96 supports the end of input assembly 92 opposite that supported by rotor shaft 84 through an operator 104. The operator is a component of torque responsive shut-off mechanism 30 and is threaded on shaft 96. This support arrangement also permits the output shaft to rotate relative to the input assembly.

The brake 26 also includes a torsion type energy absorbing device in the form of a clock-type spring 105. The outer end of the spring is fixed in any convenient fashion to an intermediate member 106 of input assembly 92. The inner end of the spring is fixed to output shaft 96. Thus, the spring provides a drive connection from the input assembly 92 of the brake to its output shaft 96.

Referring again to FIG. 1, the output shaft 96 of brake 26 has a hexagonal end 108 which fits into a matching recess 110 in the end of drive shaft 103. This rotatably connects the two shafts so that shaft 103 is driven by motor 22 through brake 26.

Drive shaft 103 is rotatably supported in casing section 24c by bearing 102 and by a bearing (not shown) which surrounds a bevel pinion 114 threaded into the right-hand end of the shaft.

Pinion 114 meshes with a bevel gear 116 mounted on the transversely extended spindle or output member 28 mentioned above. This shaft is rotatably supported in member 24c by bearings 118 and 120 and is secured in place by a locking member 124 threaded into the lower end of the casing section. A spring loaded detent 122 at the lower end of shaft 28 secures a socket or other fastener engaging component (not shown) to the shaft for rotation therewith.

To review the operation of tool 20 as thus far described, the fastener tightening operation is initiated by depressing lever 76 to admit air to the motor 22, rotating its rotor 38. Rotor shaft 84 accordingly rotates the input assembly 92 of energy absorbing device 26. Input assembly 92 rotates output shaft through spring 105; and the output shaft rotates the drive shaft 103 to which it is connected. This shaft rotates output shaft 28, causing the latter to rotate the fastener engaging component (not shown) secured to it by detent 124 to tighten the fastener.

As the fastener begins to tighten, it exerts a torque on shaft 28 which resists or opposes the torque generated by motor 22. This resisting torque is transmitted back through drive shaft 103, and spring 105 begins to "wind up" from an initial, relaxed condition. As it does so, it begins to absorb kinetic energy from rotor 38 and the other rotating components of the motor and tool and reduces the speed of rotation of these components.

As the fastener continues to tighten, spring 105 continues to wind, further decreasing the speed of motor 22 and the other rotating components and reducing their kinetic energy until the fastener has been tightened to the selected torque.[2] At this point the supply of air to motor 22 is automatically terminated to prevent further tightening of the fastener by torque responsive shut-off mechanism 30.

[2]The functioning of brake 26 is explained in more detail in parent U.S. Pat. application No. 104,209 to which the reader may refer, if desired.

Shut-off mechanism 30 includes the disc valve member 58 around which the air flows to motor 22. Valve 58 is supported in the chamber 54 in valve block 56 by the left-hand end of valve stem assembly 126.

The valve stem assembly extends from valve block 56 through rotor 38 with its right-hand end (as shown in FIG. 1) abutting the free end of a bifurcated pawl or actuator 128. The pawl is pivotally supported in a slot 130 formed in the output shaft 96 of energy absorbing device 26 by a transversely extending pivot pin 132. Pawl 128 is biased to the valve stem engaging position shown in FIG. 1 by a spring-loaded pin 134 seated in a recess 136 in shaft 96.

In this position, the valve stem assembly is held to the left as shown in FIG. 1. This keeps valve 58 in the open position shown in that figure.

To shut off the supply of air to motor 22, pawl 128 is pivoted in a [clockwide] *clockwise* direction as shown in FIG. 1 out of engagement with the right-hand end of valve stem assembly 126. This creates a force differential which moves valve 58 to the closed position.

More specifically, the annular passage 138 between the periphery of the chamber 54 in valve block 56 and valve member 58 is relatively narrow; and the face 140 of the valve member is relatively large in comparison. Accordingly, there is a relatively large pressure differential across the valve member. Therefore, when the restraint offered by pawl 128 is removed, valve 58 is moved to the closed position by the larger force acting against valve face 140.

Pawl 128 is pivoted in the valve stem freeing direction by the previously mentioned operator 104 threaded on the output shaft 96 of brake 26.

Specifically, operator 104 is connected to the input assembly 92 of the brake for rotation therewith by pins 142 which are fixed to the operator and extend through apertures 143 in endpiece 144 of the input assembly. Operator 104 accordingly rotates with but is free to move longitudinally relative to input assembly 92. A compression spring 145 surrounding operator 104 and disposed between a snap-in retainer 146 on the latter and the endpiece 144 of the input assembly insures that components 92 and 104 stay in the proper spatial relationship during the operation of tool 20.

As the spring 105 of brake 26 winds, input assembly 92 rotates relative to output shaft 96 as described above. This creates relative rotation between components 92 and 96.

As it is rotatably connected to the input assembly, operator 104 rotates relative to and moves to the left along output shaft 96 due to the threaded connection between these two components. As this occurs, the operator pushes the lower leg 147 of pawl 128 to the left, pivoting the pawl clockwise.

As the fastener reaches the preselected torque, upper leg 148 of the pawl finally rides upwardly off of the end of valve stem assembly 126. This frees valve 58 for movement to its closed position in the manner discussed above, terminating the flow of air to and the operation of motor 22. Thus, the tightening of the fastener is automatically teminated by the torque responsive shut-off mechanism when the fastener reaches the selected torque.

Referring again to the drawing, the signal generating mechanism 32 is actuated concurrently with the closing of disc valve 58 to provide a signal which indicates that the fastener has been tightened to the selected torque. As mentioned above, this signal is utilized in the illustrated tool 20 to actuate a marking unit 34, causing a small quantity of dye or ink to be placed on the fastener and provide a visual indication that the fastener has been properly tightened.

The signal generating mechanism includes a valve assembly 150 slidably mounted in a bore 152 formed in the valve block 56 in casing section 24a. A peripheral seal 154 carried by the main body member 156 of the assembly keeps air from leaking past it.

Valve assembly 150 is biased to the left to the position shown in FIG. 1 by a spring 158. This spring engages the right-hand end of the assembly and is seated in a recess 160 formed in the rear wall 162 of air motor casing 36.

With tool 20 in operation as shown in FIG. 1, line pressure air flows to the right-hand side of the valve assembly through passage 62, reinforcing the bias of spring 158. An oppositely acting force is exerted on the valve assembly by air flowing from chamber 54 through passage 164. However, this line pressure air acts on a much smaller surface than that flowing through passage 62; and the force exerted by it is not sufficient to overcome the forces exerted on the right-hand side of the valve assembly. Thus, the valve assembly remains in the FIG. 1 position.

In its left-hand position valve assembly 150 vents an air supply line 166 incorporated in marking unit 34 to atmosphere through passage 168 in casing section 24a, an aperture 170 in valve block 56, the bore 152 in the valve block, and communicating apertures 172 and 174 in the valve block and casing, respectively. Air cannot flow into the supply line while valve assembly 150 is in the FIG. 1 position. The air flow path from passage 164 through bore 152 to passages 170 and 168 is blocked by valve member 176 of the valve assembly, which is engaged with a seat 178 formed in valve block 56. Valve member 176 also keeps air in the interior of the tool from flowing through the vent passages to the exterior of the tool.

Supply line 166 continues to be vented until the fastener being tightened reaches the selected torque and the torque responsive shut-off mechanism 30 closes valve 58 (see FIG. 2), interrupting the flow of air to the right-hand side of valve assembly 150 through passage 62. At this point the pressure on the right-hand side of valve assembly 150 decreases to atmospheric because the air remaining in passage 62 escapes through passages 64 and 66 and motor 22 to the exterior of the tool.

Line pressure continues to be exerted on the left-hand side of the valve assembly by air flowing through passage 164. The force exerted by this air overcomes the oppositely directed force exerted by spring 158. Accordingly, the valve assembly shifts to the right from the FIG. 1 position to that shown in FIG. 2.

With the valve assembly in the FIG. 2 position, valve member 180 of the assembly engages a seat 182 in valve block 56. This interrupts the flow path between air supply line 166 and vent passage 174 and permits air to flow from chamber 54 through passage 164, the bore 152 in valve block 56, passages 170 and 168 in the valve block and casing section 24a, and elbow fitting 183 into the supply line.

The illustrated marking unit 34 is actuated by this flow of air under pressure into supply line 166. The marking unit is of a commercially available construction and will, accordingly, not be described in detail herein. Generally speaking, however, it includes supply line 166; a reservoir 184 fixed to the angle head section 24c of casing 24; and a valve 186, which is mounted in the lower end of the tool spindle 28. A centrally located passage 188 provides communication between the interior of the reservoir and valve 186. A threaded cap 189 can be removed to fill the reservoir with an ink, dye, or other marking fluid.

A free piston 190 is slidably mounted in the reservoir. An O-ring 192 carried by the piston keeps the marking fluid from leaking past it into air supply line 166, which extends through end wall 194 of the reservoir to its interior. The O-ring similarly keeps air from leaking past the piston into the reservoir.

The compressed air which flows into supply line 166 when the fastener being tightened reaches its selected torque and valve assembly 150 is moved to the right to the FIG. 2 position continues through the supply line to the interior of reservoir 184. Here, it impinges upon piston 190, moving the latter to the right in the reservoir as shown in FIG. 1. This forces a small amount of fluid from the reservoir through passage 188 and past valve 186 onto the fastener. This provides a visual indication that the fastener has been correctly tightened.

The tightening of the fastener and operation of the shut-off and signal generating mechanisms and marking unit 34 is followed by the release of lever 76, which stops the flow of air to the tool, and the removal of the tool from the fastener.

When lever 76 is released, the interior of the tool is vented to atmosphere through a passage 198 in casing section 24a and passages 200 and 202 in fitting 82 because the release of the lever moves an annular recess 204 in the plunger into alignment with passage 200 (see FIG. 2), permitting the air to flow around the plunger through the passage. As the pressure in the tool drops to atmospheric, the force keeping valve assembly 150 in the FIG. 2 position decreases; and spring 158 shifts the valve assembly to the left to the FIG. 1 position. This vents marking unit supply line 166 in the manner discussed previously, terminating the operation of the marking unit because there is no longer any energy available to force the marking liquid past valve 186.

In addition to resetting valve assembly 150, the release of lever 76 and consequent venting of the tool interior permits valve disc 58 to return to the open position shown in FIG. 1. Specifically, the valve stem assembly 126 is biased to the left as shown in FIG. 1 by a weak spring (not shown). The force exerted by this spring is not sufficient to overcome the valve-closing force exerted on the valve disc when line pressure is present on valve face 140. However, when the tool is vented and the pressure on valve face 140 drops to atmospheric, the spring can exert sufficient force to open the valve.

The final step in the fastener tightening cycle, the removal of the tool from the fastener, resets torque responsive shut-off mechanism 30. When the tool is removed from the fastener, spring 105 unwinds; and input assembly 92 of brake 26 rotates relative to output shaft 96 in the direction opposite to that producing the energy absorbing function. This threads operator 104 to the right along output shaft 96, returning the operator to the position shown in FIG. 1.

As this occurs, spring loaded pin 134 pivots pawl 128 in a counterclockwise direction until operator 104 reaches the FIG. 1 position. Here the pin biases lower leg 147 of the pawl against an annular ledge 205 in the operator. This aligns upper leg 148 of the pawl with the right-hand end of previously reset valve stem assembly 126 to keep valve disc 58 open until the torque responsive shut-off mechanism is again actuated.

One of the important and novel features of the tool 20 just described is that marking unit 34 cannot be actuated to provide a visual indication of a tightened fastener even though the operator may accidentally or purposely release lever 76 before the operating cycle is completed. Unless the fastener is tightened to the selected torque, the torque responsive shut-off mechanism 30 cannot actuate and valve 58 cannot close. Thus, irrespective of the improper manipulation of lever 76, valve assembly 150 will stay in the FIG. 1 position; marking unit supply line 166 will remain vented to atmosphere; and there will be no force available to expel the marking fluid past valve 186.

As indicated previously, a visual mark of the type just discussed may be placed alongside the fastener instead of directly on it. FIG. 3 illustrates a tool 206 which provides the latter type of marking. This tool is quite similar to the tool 20 described previously except for its marking unit 208. Accordingly, tool 206 will be described only to a limited extent.

Like that identified by reference character 34, marking unit 208 is of a commercially available type. And its details are not critical to the practice of the present invention. Therefore, it similarly will not be described in detail.

Referring now to FIG. 3, marking unit 208 includes a pump unit 210 connected to a marking fluid reservoir (not shown). The pump unit is also connected to a line 212 terminating in a tip 214 in which a jet orifice is formed. The tip of the supply line is secured to the right angle section 24c of the tool casing by a strap or band 216.

Marking unit 208 is actuated in the same manner as marking unit 34; i.e., by supplying a pulse of air under pressure to the marking unit when the fastener being tightened reaches the selected torque. This causes pumping unit 210 to propel a small quantity of marking fluid from the reservoir through line 212 and the jet orifice in tip 214 onto the workpiece adjacent the fastener which has been tightened.

In the embodiments of the invention described previously a compressed air signal is generated when the fastener being tightened reaches the selected torque. In contrast, in the tool 218 shown in FIG. 4, an electrical signal is produced to indicate that the fastener has been tightened to the correct torque.

Tool 218 also provides a signal indicative of the length of time for which the fastener was tightened. As discussed above, such a signal is beneficial in that it can be employed to differentiate cross threaded and other improperly tightened fasteners from those which have been correctly tightened to the selected torque.

In most respects, fastener tool 218 is similar to the tool 20 described previously. To the extent that the two tools are alike, the same reference characters will be employed to identify their components.

The most significant difference in tools 20 and 218 is in their signal generating units. The major components of the signal generating system 220 employed in tool 218 are two reed switches 222 and 224, reed switch actuators 226 and 228, and a timer which, in the illustrated embodiment of the invention, is an R-C timing circuit including a resistor 230 and a capacitor 232 (see FIG. 5).

Reed switches 222 and 224 (shown only diagrammatically in FIG. 4) are mounted in recesses 234 and 236 formed in valve block 56. Actuators 226 and 228 are slidably mounted in these passages in alignment with the reed switches. Each of the actuators carries an O-ring 238, which keeps air from leaking past it.

The actuators are biased to the left as shown in FIG. 4 by compression springs 240 and 241. These springs extend between annular ledges 242 on the actuators and internal shoulders 244 and 246 in bores 234 and 236, respectively.

The right-hand portions 247 of actuators 226 and 228 are made of a magnetic material. The magnets are so poled with respect to switches 222 and 224 that the displacement of an actuator to the right will cause the associated switch to transfer from the position shown in full lines in FIGS. 4 and 5 to the position shown in dotted lines. The subsequent return of the actuator to the position shown in FIG. 4 allows the associated reed switch to restore to the full line position.

Tool 218 operates in generally the same manner as the tools 20 and 206 described above. Depression of lever 76 toward tool casing 24 allows air to flow from hose 248 through fitting 44 and past valves 48 and 58 into the motor 22 of the tool. Air also flows from the chamber 54 in valve block 56 through passages 249 and 250, producing line pressure against the left-hand ends of switch actuators 226 and 228.

On the right-hand side of actuator 226, the passage 234 in which it is mounted is vented to atmosphere through a passage 251 extending through valve block 56 and casing section 24a to the exterior of the tool. Accordingly, there is only atmospheric pressure on the right-hand side of the actuator. There is consequently a force differential which moves the actuator to the right against the bias exerted by spring 240, causing switch 222 to transfer to the dotted line position.

Line pressure is exerted on the right-hand as well as the left-hand side of switch actuator 228 when lever 76 is depressed as the compressed air flows past disc valve 58 and through passage 252 into passage 236 on the right-hand side of the actuator. Thus, the line pressure generated forces are substantially equal on both sides of actuator 228; and spring 241 keeps this actuator in the illustrated position. Switch 224 accordingly remains in the untransferred, full line position. With switches 222 and 224 positioned as just described the R-C timing circuit is connected across a six volt voltage source 254[3] by lead 256, switch 222, lead 258, switch 224, and lead 260. Therefore, concurrently with the energization of motor 22, capacitor 232 begins to charge. Capacitor 232 continues to charge as the fastener is tightened.

[3]A low voltage power source is not essential but is preferred from the safety standpoint.

When the fastener reaches the selected torque, disc valve 58 is closed by operation of a torque responsive shut-off mechanism as in the embodiments of the invention described previously. This shuts off the supply of air to the motor and prevents further tightening of the fastener.

Also, with valve 58 seated, air can no longer flow through passage 252 to the right-hand side of switch actuator 228. Instead, the pressure on this side of the actuator drops to atmospheric, the air bleeding from passage 236 through passage 252; passages 62, 64, and 66; and motor 22 to the exterior of the tool.

As this occurs, a force differential is created across actuator 228 as line pressure continues to be applied to its left-hand end. The actuator accordingly moves to the right against the bias exerted by spring 241. This causes switch 224 to transfer to the dotted line position of FIGS. 4 and 5.

The transferring of switch 224 interrupts the continuity of the charging circuit. Accordingly, capacitor 232 is left with a charge which constitutes a signal indicative of the length of time for which motor 22 has been run and the fastener been tightened. Also, the transfer of switch 224 is a second signal which indicates that the fastener has been tightened to the selected torque and the shut-off mechanism actuated.

The length of time for which the motor 22 was run and the fastener tightened can be ascertained by measuring the voltage across terminals 262 and 264. This will typically be done automatically by an appropriate computer, which will also record the running time.

Alternate schemes for measuring the running time or for both measuring and recording it may, however, equally well be employed. For example, the running time can be ascertained simply by connecting a voltmeter calibrated in time across the terminals; and the time can be recorded manually.

Whether or not the shut-off mechanism has actuated and switch 224 transferred is determined by completing a circuit across terminals 266 and 268. If actuation has occurred, continuity can be established in and current will flow through a circuit across power source 254 which includes lead 256, lead 270, the two terminals, lead 272, switch 224, and lead 260.

Again, a computer will typically be utilized to complete the circuit across the contacts and to then determine and record whether there is a [6] *six* volt signal indicative of shut-off mechanism actuation and correct torquing of the fastener. The computer can easily be programmed to identify the joint as suspect if the [6] *six* volt signal does not appear, to subsequently ascertain the running time if the signal does appear, and to then identify the joint as suspect if the running time is not within established limits or as satisfactory if the running time is within those limits.

Again, alternative methods of ascertaining whether the fastener was tightened to the selected torque can be utilized. For example, a meter *269* can be connected across terminals 266 and 268 and the presence or absence of current flow through the circuit noted and manually recorded. Or, if recording is not required, the sequence of steps described in the preceding paragraph and the identification of satisfactory and suspect joints can be accomplished by using relatively simple logic circuits.

As will be apparent from the foregoing, tool 218 in simple fashion makes it possible to readily ascertain that the fastener tightened is at least obstensibly correctly torqued. The time for which the fastener was tightened can be ascertained with equal ease. Accordingly, both correct torquing and differentiation between correctly tightened and cross threaded or otherwise improperly tightened fasteners are furnished by tool 218.

As with the tools described previously, the release of manual operating lever 76 and the subsequent removal of the tool from the fastener reset the internal components for a subsequent cycle of operation.

When handle 76 is released, all air passages on the left-hand side of the previously closed disc valve 58 are discharged to atmosphere. Specifically, line pressure air is exhausted through passage 198 in valve block 56 and passages 200 and 202 in plunger guide 82 because continuity is established in passage 200 through the annular recess 204 in plunger 80 as the latter is returned to the illustrated position by spring 72.

Springs 240 and 241 return actuators 226 and 228 to the left to the illustrated positions; and switches 222 and 224 accordingly transfer back to their full line positions. The transfer of the switches permits capacitor 232 to discharge through a circuit including the lead 256 in which the capacitor and resistor are interposed; switch 222; and leads 272, 274, and 256.

The subsequent removal of the tool from the fastener effects the reopening of disc valve 58 and the resetting of the shut-off mechanism in the manner discussed above in conjunction with tool 20.

As in the case of tool 20, the generation of the signals indicative of a correctly tightened fastener cannot be adversely effected by the improper manipulation of lever 76, either accidentally or purposely. Switch 224 cannot be transferred to indicate the correct torquing of a fastener until the torque responsive shut-off mechanism operates. Consequently, unless the fastener is tightened to the selected torque, this mechanism is not actuated, regardless of the number of times lever 76 is depressed and released. Therefore, manipulation of lever 76 will not, without more, result in the generation of a signal indicating that a fastener has been correctly torqued.

Also, if the operating lever is improperly released, switch actuator 226 restores to the position illustrated in FIG. 4 in the same manner as when the lever is properly released at the end of the tightening cycle. Capacitor 232 then discharges and can charge again only when the lever is subsequently depressed.

Thus, if the lever is released before the end of the tightening cycle, the running time indicative charge on the capacitor will be much lower than if the lever had been properly manipulated. When the shut-off mechanism is eventually actuated and the running time determined, the running time will indicate that the joint is suspect. The joint can, accordingly, be checked to ascertain whether the unduly short running time is a result of improper manipulation of the tool or of the presence of a cross threaded fastener or other defective joint.

It will be apparent to those skilled in the arts to which the present invention pertains that the pneumatic and electrical signals generated in the above-described tools do not necessarily have to be utilized as described or suggested above. For example, both the pneumatic and electrical signals generated by the illustrated tools may be employed to operate a punch or a plunger driven applicator of the type described in the Lance and Dunlap patents identified above or be otherwise employed.

Or signals of one character may be generated while the fastener is being tightened and signals of a diverse character generated when the torque responsive mechanism is actuated. As an example, the exhaust side of the motor 22 in tool 20 can be connected through a line to aperture 174 in casing section 24a. In this modification a relatively low, exhaust pressure signal is supplied to line 166 until torque responsive shut-off mechanism 30 actuates. Upon actuation of the shut-off mechanism a higher, line pressure signal is supplied to the supply line in the manner described above in conjunction with the operation of tool 20.

Also, signals other than those of electrical or pneumatic character may be generated as long as the tool in which the invention is realized is capable of generating a signal which will indicate that a fastener has been tightened to a selected torque or will generate such a signal in combination with one indicative of the length of time for which the fastener was tightened. Furthermore, it will be apparent that the principles of the present invention can be employed in fastener tools generally, not just in the nut runners illustrated and described herein.

Accordingly, to the extent that embodiments of the invention other than those described above and illustrated in the drawing are not expressly excluded from the appended claims, they are fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tool for tightening fasteners comprising: an output member adapted to have a fastener engaging member attached thereto; a motor; means drive-connecting said motor to said output member; means for supplying operating energy to the motor; torque responsive means operable as the fastener being tightened reaches a selected torque to concomitantly produce a signal to indicate that the fastener has been tightened to the selected torque and to interrupt the flow of operating energy to the motor; and means activatable by the signal generated by the signal generating means to provide on or in the proximity of the fastener which has been tightened a visual indication of the reaching of the selected torque by the fastener.

2. A tool for tightening fasteners comprising: a housing; a fastener rotating output member rotatably supported from said housing; means in said housing for rotating said output member; and torque responsive means in said housing which is operable when the fastener being tightened has reached a selected torque to produce an electrical signal to indicate that the fastener was tightened to the selected torque, said signal generating means comprising a switch and means for actuating said switch when said selected torque is reached and the means for actuating said switch comprising an actuator movable toward and away from said switch, means biasing said actuator away from said switch, passages through which an operating fluid can flow to said actuator to move it toward said switch against the force exerted by said biasing means and thereby actuate said switch, and means for so controlling the flow of fluid through said passages to said switch actuator that the actuator is displaced to actuate the switch when said selected torque is reached.

3. A tool for tightening fasteners comprising: a fastener rotating output member; means for rotating said output member; and means operable when the fastener being tightened has reached a selected torque to produce one signal to indicate that the fastener has been tightened to the selected torque and a second signal indicative of the length of time for which the output member was rotated, said second signal thereby providing a differentiation between properly and improperly tightened fasteners.

4. A tool for tightening fasteners comprising: a fastener rotating output member; means for rotating said output member; torque responsive means operable when the fastener being tightened has reached a selected torque to terminate the rotation of the output member and prevent further tightening of the fastener; and means operable to produce a signal indicative of the length of time for which the output member was rotated, said signal thereby providing a differentiation between properly and improperly tightened fasteners.

5. The tool of claim 4, wherein the signal producing means further includes means for producing a second signal when said fastener reaches the selected torque which will provide an indication that the fastener has been tightened to the selected torque.

6. The tool of claim 4, wherein the means for rotating the fastener includes a motor which is energizable to rotate the output member and de-energizable to stop the rotation of said member and wherein said signal generating means comprises a timer means; means for actuating said timer means concurrently with the energization of said motor; and means for terminating the timing action of said timer means concurrently with the deenergization of said motor.

7. The tool of claim 6, wherein said timer means is electrically operated; wherein said tool further comprises circuit means for connecting said timer means across an electrical power source; wherein the means for actuating said timer means comprises a first switch and means for so actuating said first switch as to complete the continuity of said circuit means when said motor is energized; and wherein the means for terminating the timing action of the timer means comprises a second switch and means for so actuating said switch when said selected torque is reached as to interrupt the continuity of said circuit means.

8. The tool of claim 7, wherein said first and second switches are magnetically actuatable; wherein said signal generating means further comprises first and second magnetic switch actuators mounted in said tool for movement toward and away from said first and second switches, respectively, means biasing said actuators away from said switches, and passages through which an operating fluid can flow to said actuators to move them toward said switches against the forces exerted by said biasing means and thereby actuate said switches; and means for so controlling the flow of fluid through said passages to said switch actuators that the first actuator is displaced to actuate the first switch when the motor is energized and the second actuator is displaced to actuate the second switch when the motor is deenergized.

9. The tool of claim 8, wherein said motor is a pneumatic motor and wherein the means for controlling the flow of operating fluid comprises a first valve which is manually actuatable to allow operating fluid to flow to and energize said motor and to flow to and displace said first switch actuator in the switch actuating direction and a second valve automatically operable when the selected torque is reached to terminate the flow of operating fluid to and de-energize said motor and to so effect the flow of fluid to said second actuator as to displace said second actuator in the switch actuating direction.

10. The tool of claim 9, together with means including said first valve which is manually actuatable following the actuation of at least one of said switches to so alter the flow of fluid to the actuator associated with each actuated switch as to permit the associated biasing means to displace the actuator away from and effect the deactuation of the switch.

11. The tool of claim 10, together with means for resetting said second valve.

12. The tool of claim 11, together with means from which it can be ascertained if said second switch means has been actuated prior to the actuation of the resetting means, whereby said signal generating means further provides a signal indicating whether the fastener was tightened to the selected torque.

13. A tool for tightening fasteners comprising: a housing, a fastener rotating output member rotatably supported from said housing; a pneumatic motor in said housing; means drive-connecting said motor to said output member; means for supplying operating fluid to said motor; means for generating a signal; and means for both shutting off the supply of fluid to the motor and actuating the signal generating means when a fastener being tightened has been tightened to a selected torque, said signal generating means comprising means providing a path through which the operating fluid can flow to generate a pneumatic signal and a fluid actuatable valve means movable between first and second positions in which it respectively interrupts and permits the flow of fluid through said path.

14. The tool of claim 13, together with means providing a flow passage through which operating fluid can flow to said motor and to said fluid actuatable valve and means providing a valve seat in said passage and wherein the means for actuating the signal generating means comprises a valve member disposed in said passage and movable toward and away from said valve seat to control the flow of operating fluid through said passage; a valve stem means supporting said valve member in said passage; an actuator; means biasing said actuator to a position in which said actuator so engages said valve stem means as to hold the valve member away from the valve seat; and means operable as the fastener is tightened to the selected torque to move said actuator out of engagement with said valve stem means and thereby free said valve member for movement toward said seat.

15. The power-operated tool of claim 14, together with a wall means surrounding said valve member and cooperating with said member to restrict the flow of operating fluid through said passage, whereby there is a pressure drop across said valve member which generates a force for moving the valve member toward the valve seat in the absence of a restraint on the valve member.

16. The tool of claim 13, wherein said operating fluid supply means comprises a first valve which is manually displaceable to an open position to allow operating fluid to flow into the interior of the tool housing; and wherein the means for actuating the signal generating means and shutting off the flow of operating fluid to the motor comprises a second, normally open valve movable to a closed position when said selected torque is reached, said tool further including means through which said fluid can so flow as to maintain said fluid actuatable valve means in said first position when said first and second valves are open and as to displace said valve means to said second position when the selected torque is reached.

17. The tool of claim 16, together with means operable following the displacement of said fluid actuatable valve means to said second position and the subsequent closing of the first valve to return said fluid actuatable valve means to its first position and said second valve to its open position.

18. A tool for tightening fasteners comprising: a housing; a fastener rotating output member rotatably supported from said housing; a pneumatic motor in said housing; means drive-connecting said motor to said output member which comprises means operable beginning with the exertion of a rotation resisting force by the fastener being tightened to brake and thereby reduce the speed and absorb the kinetic energy of the rotating drive component(s) of the tool and thereby keep said energy from being applied to and overtightening the fastener engaged by the output member; means for supplying operating fluid to said motor; means for generating a signal, and means for both shutting off the supply of air to the motor and actuating the signal generating means when a fastener being tightened has been tightened to a selected torque.

19. A tool for tightening fasteners comprising: a housing, a fastener rotating output member rotatably supported from said housing; a pneumatic motor in said housing; means drive-connecting said motor to said output member; means for supplying operating fluid to said motor; means for generating a signal; and means for both shutting off the supply of air to the motor and actuating the signal generating means when a fastener being tightened has reached a selected torque, said signal generating means comprising flow means through which the operating fluid can flow to generate a pneumatic signal, a fluid actuatable valve means movable between a first position in which said valve means permits flow of the pneumatic fluid to said motor and inhibits the flow of said fluid to said flow means and a second position in which said valve means terminates the flow of the pneumatic fluid to the motor and removes the inhibition on the flow of the fluid through the flow means, and means for effecting the movement of the valve means from the first to the second of the positions thereof when said selected torque is reached.

20. The tool of claim 19, together with selectively operable means which, when operated, will result in the interruption of the flow of pneumatic fluid through said flow means.

21. A tool for tightening fasteners comprising: a housing; a fastener rotating output means rotatably supported from said housing; a pneumatically activatable marking means for providing on or in the proximity of the fastener being tightened a visual indication of the reaching of a selected torque by the fastener, said marking means being housed at least in part in said rotatably supported output means; a pneumatic motor in said housing; means drive-connecting said motor to said output means; means for supplying operating fluid to said motor, flow means through which operating fluid can flow to activate said marking means; valve means operable when actuated to both shut off the supply of operating fluid to the motor and effect a flow of fluid through said flow means; and means for automatically actuating said valve means when the fastener being tightened has reached the selected torque.

22. A tool of claim 21, wherein said marking means comprises a member which, when displaced, will result in the producing of said visual signal, means including a slidably mounted piston for displacing said member, and means providing fluid communication between said flow means and said piston so that said operating fluid will operate upon said piston and cause the piston to displace said member and activate said marking means.

*23. A tool for tightening fasteners comprising: a fastener rotating output member; means for rotating said output member; means operable to terminate the rotation of the output member when a fastener being tightened has been tightened to a selected torque; and means operable concomitantly with the rotation of the output member for measuring the length of time for which said member is rotated in tightening the fastener to the selected torque and for thereby providing a signal indicative of whether the output member has been rotated for a length of time which will result in the fastener being properly tightened to make a satisfactory joint.*

*24. A tool for tightening fasteners comprising: a fastener rotating output member; means for rotating said output member; means operable to terminate the rotation of the output member when a fastener being tightened has been tightened to a selected torque; and means which is operable when the fastener has been tightened to said torque for*

*providing an indication of whether the output member has been rotated for a length of time which will result in the fastener being properly tightened to make a satisfactory joint.*

*25. The tool of claim 24 wherein said signal generating means includes a timing circuit means for generating an output signal which will have a selected minimum voltage if the fastener is tightened for the length of time necessary to insure proper tightening.*

*26. The tool of claim 25 together with a first switch means operable from one to the other of two states concomitantly with the initiation of a fastener tightening operation to initiate the timing sequence of the timing circuit means and a second switch means operable from one of the other of two states concomitantly with the tightening of the fastener to a selected torque to terminate the timing sequence of the timing circuit means.*

*27. The tool of claim 25 wherein the timing circuit means includes a series connected resistor and capacitor and a switch operable from one to the other of two states to connect said capacitor to a source of electrical energy concurrently with the initiation of a fastener tightening operation.*

* * * * *

UNITED STATES PATENT OFFICE

CERTIFICATE OF CORRECTION

Patent No. Re. 29,444 Dated October 18, 1977

Inventor(s) Robert H. Alexander

It is certified that error appears in the above-identified patent and that said Letters Patent are hereby corrected as shown below:

Claim 22, - Column 16, line 43 change "A" to --The--

Claim 26, - Column 18, line 2 change "of" to --to--

Column 6, line 2, after "a" delete "[Clockwide]".

Column 11, line 37, change "obstensibly" to -- ostensibly --.

Column 11, line 61, change "272" to -- 273 --.

Claim 22, Column 16, line 43, change "A" to -- The--

Claim 26, Column 18, line 2, change "of" to -- to --

Signed and Sealed this

*Twentieth* Day of *June 1978*

[SEAL]

*Attest:*

RUTH C. MASON
*Attesting Officer*

DONALD W. BANNER
*Commissioner of Patents and Trademarks*